(12) United States Patent
Friend et al.

(10) Patent No.: US 9,494,430 B2
(45) Date of Patent: Nov. 15, 2016

(54) POSITIONING SYSTEM IMPLEMENTING MULTI-SENSOR POSE SOLUTION

(71) Applicant: Caterpillar Inc., Peoria, IL (US)

(72) Inventors: Paul Russell Friend, Morton, IL (US); Qi Chen, Dunlap, IL (US); Nicholas Robert Vogel, Peoria, IL (US); Andrew Thomas Whitten, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 9 days.

(21) Appl. No.: 14/524,727

(22) Filed: Oct. 27, 2014

(65) Prior Publication Data

US 2016/0116289 A1   Apr. 28, 2016

(51) Int. Cl.
   *G01C 21/00* (2006.01)
   *G01C 21/16* (2006.01)

(52) U.S. Cl.
   CPC .................. *G01C 21/165* (2013.01)

(58) Field of Classification Search
   CPC .............. G01C 21/165; G01C 21/28; G01S 19/42; G01S 19/258; G01S 19/30; G01S 19/29; G05D 1/0246; B62D 5/0463
   USPC ............ 701/28, 41, 469; 414/335; 702/104; 382/104
   See application file for complete search history.

(56) References Cited

U.S. PATENT DOCUMENTS

| | | | |
|---|---|---|---|
| 5,012,424 A | 4/1991 | Dodson | |
| 5,375,059 A | 12/1994 | Kyrtsos et al. | |
| 5,640,325 A | 6/1997 | Banbrook et al. | |
| 5,719,764 A | 2/1998 | McClary | |
| 6,276,332 B1 * | 8/2001 | Storhok | F02D 11/106 123/361 |
| 7,206,694 B2 | 4/2007 | Huddle et al. | |
| 7,711,476 B2 * | 5/2010 | Chiou | G01S 7/40 340/901 |
| 7,805,245 B2 | 9/2010 | Bacon et al. | |
| 8,290,744 B2 * | 10/2012 | Brady | G01C 21/16 702/183 |
| 8,521,412 B2 * | 8/2013 | Miucic | G01C 21/28 701/300 |

(Continued)

OTHER PUBLICATIONS

Dr. Bruno Scherzinger and Joe Hutton, Applanix Corporation, "Applanix IN-Fusion™ Technology Explained", pp. 1-4.

*Primary Examiner* — Shardul Patel
(74) *Attorney, Agent, or Firm* — Finnegan, Henderson, Farabow, Garrett & Dunner, LLP; L. Glenn Waterfield (57) ABSTRACT

A system for determining the position of a mobile machine is disclosed. The system may include a first sensor configured to generate a first signal indicative of a pose of the mobile machine, a second sensor configured to generate a second signal indicative of a parameter of the mobile machine, and a controller in communication with the first and second sensors. The controller may be configured to generate a measured pose of the mobile machine based on the first signal, to generate an estimated pose of the mobile machine based on the second signal, and to determine uncertainty values associated with each of the measured and estimated poses. The controller may be further configured to determine overlap of the uncertainty values, to selectively adjust the measured pose based on the overlap, and to determine a pose solution based on the estimated pose and adjustment of the measured pose.

20 Claims, 4 Drawing Sheets

(56) References Cited

U.S. PATENT DOCUMENTS

| | | | | |
|---|---|---|---|---|
| 2004/0102900 A1* | 5/2004 | Ibrahim | G01C 21/005 | 701/470 |
| 2004/0167667 A1* | 8/2004 | Goncalves | G01C 21/12 | 700/245 |
| 2007/0299603 A1* | 12/2007 | Kirby | G01C 21/28 | 701/408 |
| 2008/0068263 A1* | 3/2008 | Tekawy | G01S 19/53 | 342/357.36 |
| 2010/0253597 A1* | 10/2010 | Seder | B60R 1/00 | 345/7 |
| 2012/0053831 A1* | 3/2012 | Halder | G01C 21/165 | 701/439 |
| 2013/0197736 A1* | 8/2013 | Zhu | G05D 1/0088 | 701/26 |
| 2014/0180579 A1* | 6/2014 | Friend | G01B 11/00 | 701/469 |
| 2014/0293052 A1* | 10/2014 | Kuehnle | G06T 7/0042 | 348/148 |

* cited by examiner

POSITIONING SYSTEM IMPLEMENTING MULTI-SENSOR POSE SOLUTION

TECHNICAL FIELD

The present disclosure relates generally to a positioning system and, more particularly, to a positioning system implementing a multi-sensor pose solution.

BACKGROUND

Machines such as haul trucks, dozers, motor graders, wheel loaders, and other types of heavy equipment are used to perform a variety of tasks. Some of these machines can be autonomously controlled, semi-autonomously controlled, or remotely controlled, In any of these situations, control of the machines may be dependent on navigational data provided by different sensors mounted onboard the machines. In order for the machines to operate properly, the information provided by the sensors must be accurate. And even though most machine sensor systems are calibrated when first commissioned, vibrations, collisions, interference, range issues, and damage to the machine during operation can reduce the quality of information provided by the sensors.

An exemplary navigation system is disclosed in U.S. Patent Application Publication No. 2014/0180579 ("the '579 publication") of Friend et al. that published on Jun. 26, 2014. The system of the '579 publication discloses a positioning system having a perception sensor, a locating device, and a controller in communication with the perception sensor and the locating device. The controller is configured to receive from the perception sensor scene data describing an environment in a vicinity of a machine, and a positioning signal from the locating device. The controller is further configured to estimate a first position of the machine based on the scene data, to estimate a second position of the machine based on the positioning signal, and to compare the first position to the second position. The controller is configured to then estimate a final position of the machine based on the comparison. The controller is further configured to error check the final position by comparing the final position to the second position, and to declare a fault when the final position is not within a predetermined range of the second position.

Although the system of the '579 publication may be useful in determining the position of a machine with improved accuracy provided by error checking, it can still be improved. In particular, the system of the '579 publication may not provide sufficient granularity to determine which of the perception sensor and the locating device is malfunctioning or should be relied on when the third position does not sufficiently agree with the second position.

The positioning system of the present disclosure is directed toward solving one or more of the problems set forth above and/or other problems of the prior art.

SUMMARY

In one aspect, the present disclosure is directed to a positioning system for a mobile machine. The positioning system may include a first sensor configured to generate a first signal indicative of a pose of the mobile machine, a second sensor configured to generate a second signal indicative of a parameter of the mobile machine, and a controller in communication with the first and second sensors. The controller may be configured to generate a measured pose of the mobile machine based on the first signal, to generate an estimated pose of the mobile machine based on the second signal, and to determine uncertainty values associated with each of the measured and estimated poses. The controller may be further configured to determine an overlap of the uncertainty values, to selectively adjust the measured pose based on the overlap, and to determine a pose solution based on the estimated pose and adjustment of the measured pose.

In yet another aspect, the present disclosure is directed to a method of determining a position of a mobile machine. The method may include generating a measured pose of the mobile machine, generating an estimated pose of the mobile machine, and determining uncertainty values associated with each of the measured and estimated poses. The method may also include determining an overlap of the uncertainty values, selectively adjusting the measured pose based on the overlap, and determining a pose solution based on the estimated pose and adjustment of the measured pose.

DETAILED DESCRIPTION

Figure 1:
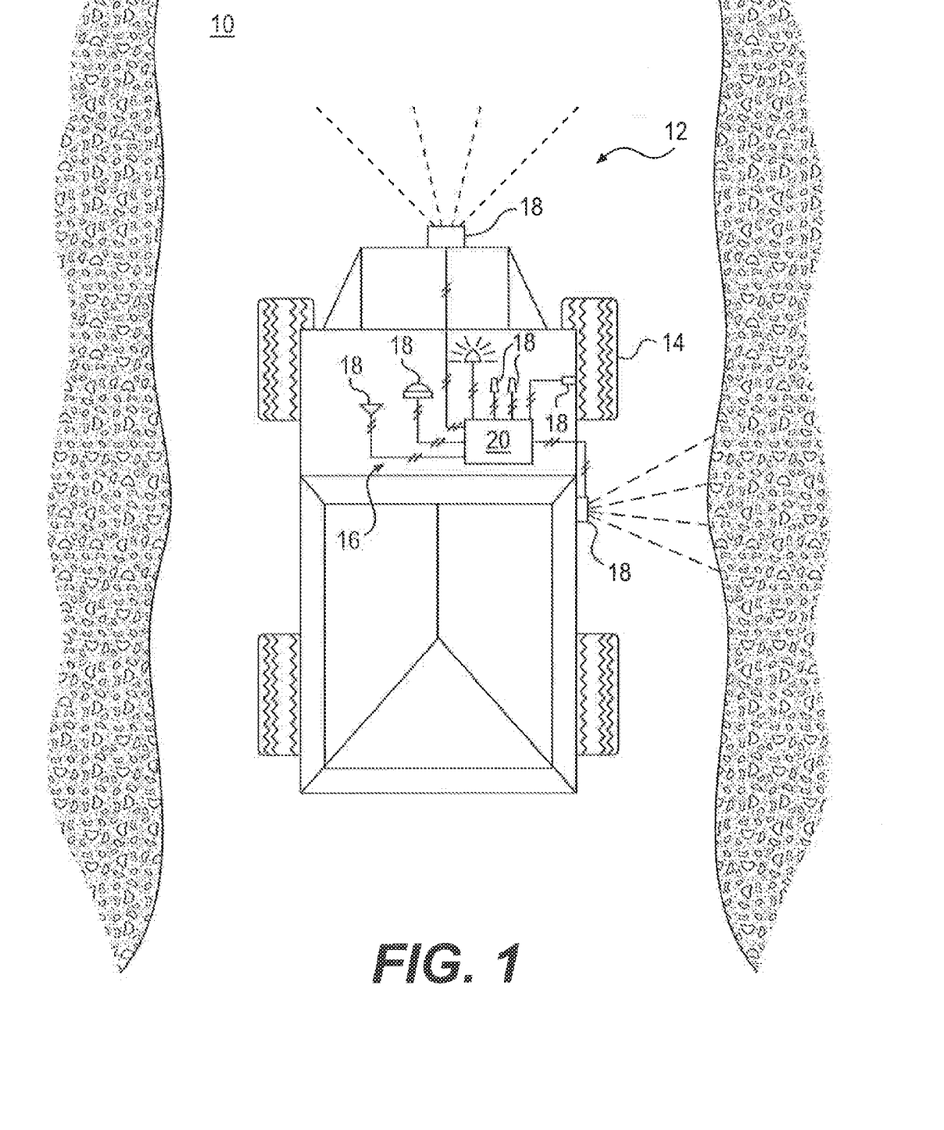
FIG. 1 is a diagrammatic illustration of a machine equipped with an exemplary disclosed positioning system.

FIG. 1 illustrates a worksite 10 and an exemplary machine 12 performing a task at worksite 10. Worksite 10 may include, for example, a mine site, a landfill, a quarry, a construction site, or any other type of worksite. The task being performed by machine 12 may be associated with altering the geography at worksite 10, and may include a hauling operation, a grading operation, a leveling operation, a plowing operation, a bulk material removal operation, or any other type of operation. As machine 12 operates at worksite 10, the shapes, dimensions, and general positions of the terrain may change.

Machine 12 may embody a mobile machine, for example a haul truck, a dozer, a motor grader, or a loader. Machine 12 may be a manned machine configured to traverse worksite 10 under the control of an operator, a self-directed machine configured to autonomously traverse worksite 10, or a hybrid machine configured to perform some functions autonomously and other functions under the control of a local or remote operator. Machine 12 may include an engine or other power source (not shown) functional to provide a power output for various operations of machine 12. The power produced by the engine may be directed to various electrical and mechanical systems of machine 12 such as, for example, a transmission (not shown) for transmitting the power to one or more traction devices 14 (e.g., tracks), to a hydraulic system (not shown) for driving one or more hydraulic components in machine 12, to an implement system (not shown) for actuating one or more work tools, or to any other electrical or mechanical system configured to perform an operation associated with machine 12.

Machine 12 may be equipped with a positioning system (system) 16 that facilitates or enhances navigation about worksite 10. System 16 may include, among other things, a plurality of positioning sensors 18 in communication with a controller 20. Positioning sensors (sensors) 18 may include any number and/or combination of devices known in the art for generating signals indicative of a pose (i.e., position, orientation, acceleration, velocity, heading, angular rate, and/or other parameter) of machine 12. For example, sensors 18 could include one or more of a GNSS (Global Navigation Satellite System) receiver, an IMU (Inertial Measurement Unit), a mechanical odometer, a visual odometer, a perception position sensor, a compass, a ground speed RADAR (Radio Detection And Ranging) or LIDAR (Light Detection And Ranging) receiver, a pseudolite receiver, etc. These sensors 18 may be connected to each other and to controller 20 via a common bus (not shown) or via any other architecture known in the art, including any combination of wired and/or wireless networks. Such networks may be integrated into a local area network, a wide area network, and/or the Internet. Some or all of these sensors 18, in addition to generating signals indicative of the pose of machine 12, may also be configured to generate signals indicating an uncertainty measure associated with the pose signals. The uncertainty measure may be specific to a certain type of sensor, a particular sensor, changing operational conditions of the sensor, and other factors known in the art. In some embodiments, sensors 18 may be preprogrammed with unique uncertainty measures, while controller 20 may be capable of calculating and/or adjusting the uncertainty measures for other sensors 18. And based on the pose signals and the uncertainty measures from one or more of these sensors 18, controller 20 may be configured to directly measure and to also estimate the pose of machine 12 with a high degree of accuracy, as will be explained in more detail below.

Some sensors 18 may be faster, more accurate, and/or more reliable than other sensors 18 in generating pose signals. For example, some sensors 18 (e.g., GNSS receivers) may be capable of directly measuring a pose of machine 12 at a rate of about 10 Hz, while other sensors 18 (e.g., IMUs 18, odometers 18, etc.) may generate signals used by controller 20 to estimate the pose of machine 12 at a much faster rate (e.g., at about 100 Hz). Likewise, some sensors 18, such as the GNSS receiver 18, may be more accurate than other sensors 18. However, the GNSS receiver 18 may be blocked from communicating with satellites at times, such as when machine 12 is operating in a canyon or during an overcast day. For these reasons, controller 20 may be configured to simultaneously rely on signals from all sensors 18 during machine navigation.

Controller 20 may include one or more processors and a memory, included together or provided separately. The processor(s) may include any known processing device(s), such as a microprocessor from the Pentium™ or Xeon™ family manufactured by Intel™, the Turion™ family manufactured by AMD™, any of various processors manufactured by Sun Microsystems, or any other type of processor. The memory may include one or more storage devices configured to store information used by controller 20 to perform certain functions related to disclosed embodiments. The storage devices may include volatile or non-volatile, magnetic, semiconductor, tape, optical, removable, nonremovable, or another type of storage device. The storage device may store programs and/or other information, such as information related to processing data received from one or more sensors 18, as discussed in greater detail below.

In one embodiment, the memory may include one or more pose estimation and solution programs or subprograms loaded from the storage device (or elsewhere) that, when executed by the processor(s), perform various procedures, operations, or processes consistent with the disclosed embodiments. For example, the memory may include one or more programs that enable controller 20 to collect data from sensors 18, and to process the data according to the methods illustrated in FIGS. 2-6.

In certain exemplary embodiments, the pose estimation and/or solution programs may enable controller 20 (more particularly enable the processor of controller 20) to process the signals received from sensors 18 using a Kalman filter to measure and to estimate the poses and final solution of machine 12. A Kalman filter, as is known in the art, is a mathematical method that may be used to determine accurate values of measurements observed over time, such as measurements taken in a time series.

FIGS. 2-6 illustrate exemplary processes implemented by controller 20 to measure the pose, estimate the pose, and calculate the final pose solution of machine 12. A detailed description of FIGS. 2-6 is provided in the following section.

INDUSTRIAL APPLICABILITY

The disclosed positioning system may be applicable to any machine where accurate detection of the machine's pose is desired. The disclosed positioning system may provide for improved measuring and estimating of the machine's pose by utilizing independent position signals generated by multiple redundant sensors 18, and checking the accuracy of the different signals prior to determining a final pose solution of machine 12 based on a combination of measurements and estimates. Operation of positioning system 16 will now be described in connection with FIGS. 2-6.

Figure 2:
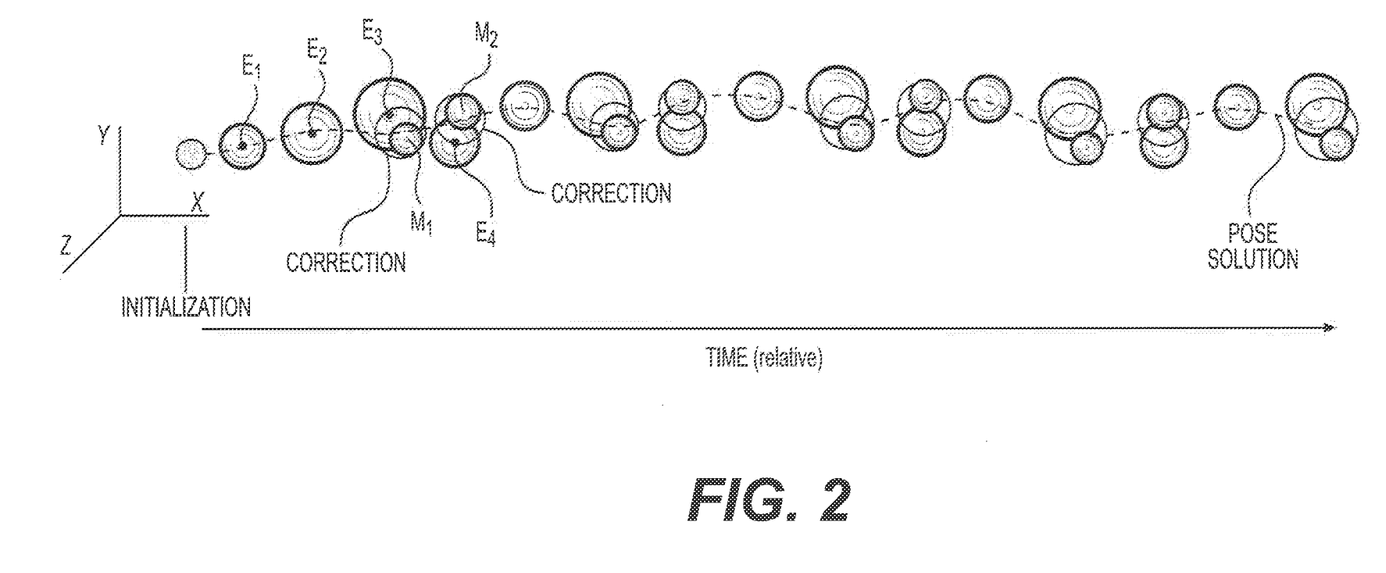
FIGS. 2 is a diagram illustrating an exemplary disclosed process that may be performed by the positioning system of FIG. 1.
Figure 3:
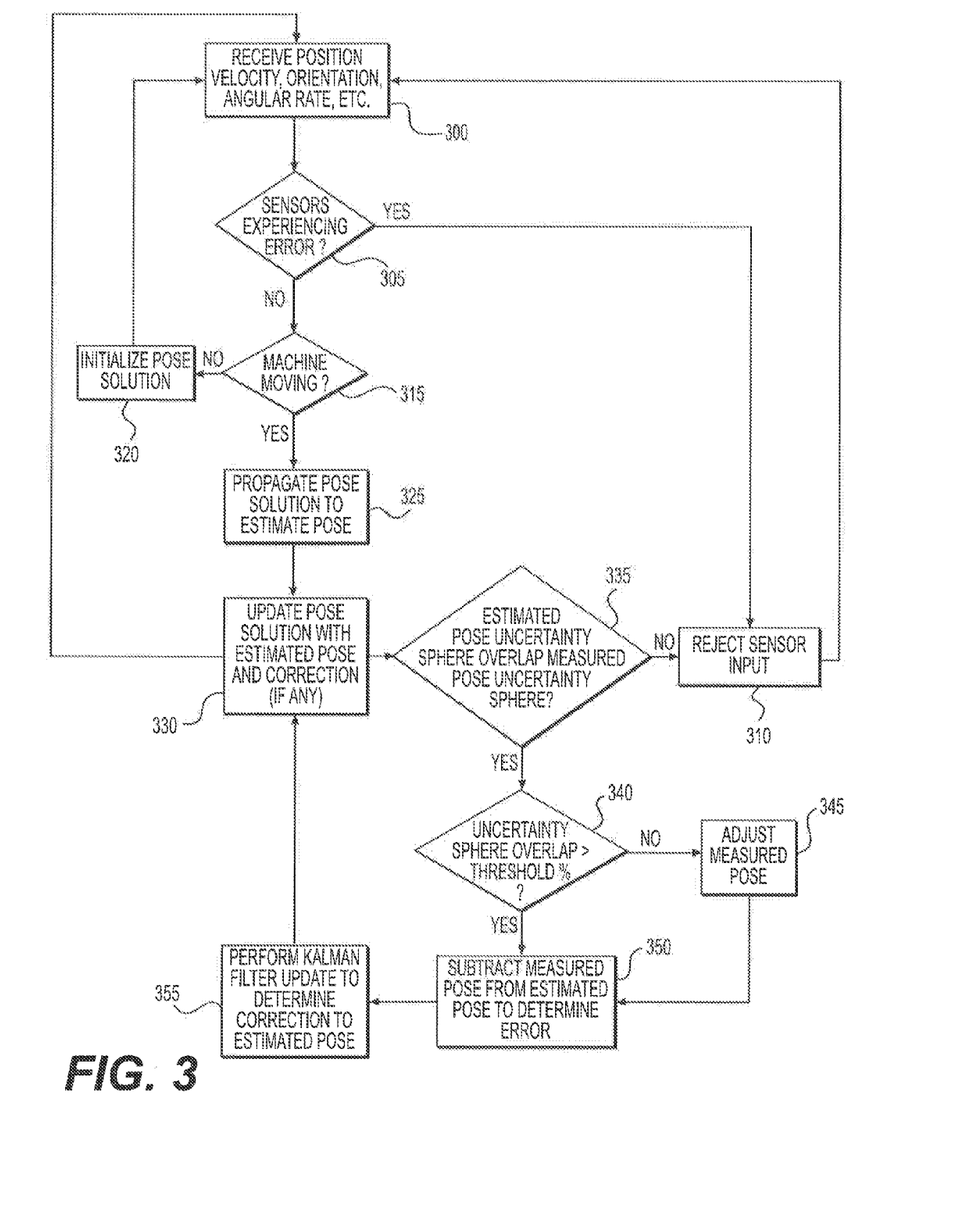
FIG. 3 is a flowchart associated with the process of FIG. 2.
Figure 4:
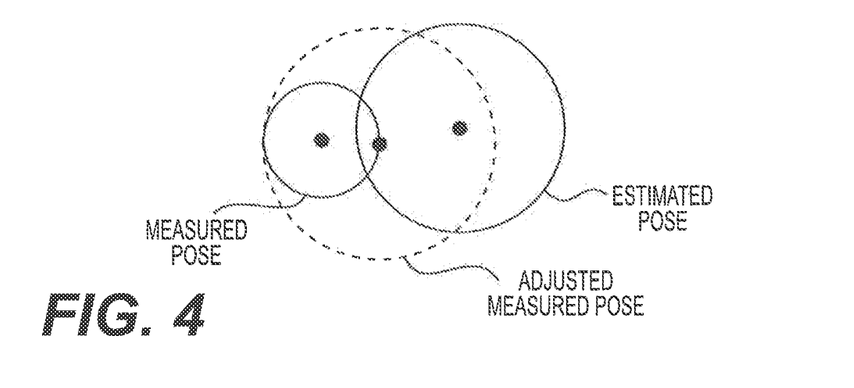
FIGS. 4-6 are diagrams illustrating alternative processes that may be implemented by the positioning system of FIG. 1.

Throughout the discussion of the flowchart depicted in FIG. 3, the terms "estimated pose," "measured pose," and "pose solution" may be utilized. For illustrative purposes, the estimated poses (labeled as $E_1, E_2, \ldots E_n$) and the measured poses (labeled as $M_1, M_2, \ldots M_n$) of machine 12 are each represented in FIG. 2 as a point in 3-dimensional space, with corresponding uncertainty values (described above as being associated with a level of confidence that the provided pose is accurate, and corresponding with the particular sensor(s) 18 used to generate the particular pose) each represented as a sphere around the point (or as a circle in the case of 1-D or 2-D sensor signal). A smaller uncertainty value may correspond with a sphere having a smaller radius, whereas a larger uncertainty value may correspond with a sphere having a larger radius.

In general, a measured pose may have a smaller uncertainty value than an estimated pose due to the inherently higher level of accuracy associated with a sensor 18 that directly measures the pose of machine 12 (e.g., a GNSS sensor 18). When the estimated pose is generated at about the same time as the measured pose, the corresponding points in space may be fairly close to each other and the associated spheres may overlap. The closer the estimated pose is to the measured pose and the more synchronous the two measurements are, the more the spheres may overlap. The opposite may also be true.

In the disclosed embodiment, estimated poses are generated more often than measured poses. For example, the pose of machine 12 may be estimated at a rate of about 100 Hz, while the measured pose may be generated at a rate of about 10 Hz. Accordingly, each time a measured pose is generated, an estimated pose may also be generated at about the same time because of the increased frequency of estimated pose generation. When an estimated and a measured pose are generated at about the same time such that their associated uncertainty spheres overlap somewhat (i.e., generally synchronously), controller 20 may correct the estimated pose based on the overlap. The pose solution can be represented as a curve-fit line drawn through the centers of each of the estimated poses (including any corrections made to the estimated poses). The pose solution may then be relied on by machine 12 for use in machine navigation and control.

With reference to FIG. 3, at startup of machine 12, controller 20 may begin receiving signals from sensors 18 indicative of machine position, velocity, orientation, angular rate, etc. (Step 300). Controller 20 may then check to see if any of sensors 18 are experiencing errors (Step 305). This check may include, among other things, one or more of a communication check, a diagnostic check, a timing check, an out-of-range check, and an in-range cross-check.

The communication check may be used to see if signals are being generated by each particular sensor 18 and if the signals are being successfully communicated to controller 20. Any communication check known in the art may be used for this purpose. For example, a conventional checksum routine may be performed, wherein a sum is generated over a defined period of time of parity bits or digits comprising each signal, and the sum then compared to a threshold value (e.g., to zero). This comparison may confirm that a signal is being generated by the corresponding sensor 18 and that the signal does not include an all-zero message.

The diagnostic check may be used to confirm that desired conditions are present to allow each particular sensor 18 to operate properly. Any diagnostic check known in the art may be used for this purpose, and the diagnostic check may change for each type of sensor 18. For example, for a GNSS receiver 18, the diagnostic check may include a check to ensure that a minimum number of satellites are communicating with the receiver 18 (e.g., 4 or more), that a Position Dilution of Precision (PDOP) condition has a minimum value (e.g., at least 20—associated with required geometric positioning of connected satellites), and that the Real Time Kinematics (RTK—phase ambiguities associated with the known location of a local base station used to relay satellite signals) are known and fixed. When the desired conditions of each sensor 18 are satisfied, it may be assumed that the sensor 18 will perform properly.

The timing check may be used to confirm that the data being generated by each sensor 18 is relevant at the time it is received by controller 20. In other words, controller 20 may compare a time of signal generation with a current time to determine if the signal is outdated. In the disclosed embodiment, signals that are older than about 5 ms may no longer be valid. The particular age requirement for each sensor 18 may be different and configurable, as desired.

The out-of-range check may be used to confirm that the data being generated by each sensor 18 is within expected ranges and/or capabilities of machine 12. In particular, controller 20 may check the signals from each sensor 18 to determine if the signals exceed dynamic thresholds for that particular sensor 18 and/or for machine 12. For example, a signal from a particular sensor 18 indicating a large position jump over a short period of time that corresponds with a velocity of machine 12 being greater than a capacity of machine 12 may be considered invalid. The dynamic thresholds may be different for each sensor 18 (and each application) and configurable, as desired.

The in-range cross-check may be used to compare signal values from different sensors 18 with pre-checked data. For example, controller 20 may compare a velocity signal from a first sensor 18 with a pre-checked velocity signal from a second sensor 18. If the velocity signals disagree by an amount greater than a threshold value, the velocity signal from the first sensor 18 is determined to be invalid. The cross-check threshold may be different for each sensor 18 and configurable, as desired.

If, after performing the device checks of step 305, any errors are detected, the corresponding sensor 18 may be rejected as inoperable and input from that sensor 18 not further processed (Step 310). Control may cycle from step 310 back to Step 300. Otherwise, the input is validated and sensors 18 may be acceptable for continued use.

When sensors 18 are determined to be generally error-free, controller 20 may determine based on the signals from sensors 18 if machine 12 is moving (Step 315). If machine 12 is not moving (i.e., if machine 12 is stationary), controller 20 may initialize the pose solution based on the signals generated by sensors 18 (Step 320). In particular, controller 20 may set the pose solution of machine 12 equal to the pose measured by one or more pre-selected sensors 18 (e.g., a GNSS receiver 18 or grouping of GNSS receivers 18). In this situation, the pose solution may pass through the center of the measured pose. Control may cycle from step 320 back to step 300.

It is contemplated that, in sonic embodiments, the pose solution may not be initialized each time that machine 12 is determined to not be moving, if desired. For example, the pose solution, in some applications, may only be initialized at first startup of machine 12. In other applications, the pose solution may be initialized only when machine 12 is placed in a "park" condition or is stopped for at least a minimum amount of time. Other strategies may also be utilized, if desired.

When controller 20 determines at step 315 that machine 12 is moving, controller 20 may estimate the pose of machine 12 based on the signals from sensors 18 and propagation of the pose solution determined during the previous cycle (Step 325), and then update the pose solution for the current cycle with the estimated pose at a rate of about 100 Hz (plus any corrections at a rate of about 10 Hz) (Step 330). In particular, controller 20 may use a dead reckoning procedure (or other known procedure) based on signals generated from an IMU sensor 18, an odometer sensor 18, a RADAR or LIDAR sensor 18, or another similar sensor 18 to estimate each new pose. For example, based on a detected distance traveled in a detected heading over a specified period of time since completion of the previous pose solution determination, controller 20 may be able to estimate a new pose of machine 12. In the embodiment disclosed in FIG. 2, controller 20 estimated pose $E_1$ based on the initialized or measured pose, estimated pose $E_2$ based on pose $E_1$, and estimated pose $E_3$ based on pose $E_2$. And the pose solution passes through the centers of each of these poses. Note in FIG. 2 the increasing radiuses of the uncertainty spheres associated with poses $E_2$ and $E_3$ (relative to $E_1$) due to the fact that poses $E_2$ and $E_3$ were each estimated based on a previous estimate.

Each time a measured pose of machine 12 is received by controller 20, controller 20 may determine if the uncertainty spheres of the measured pose and the most synchronous estimated pose overlap (i.e., if the two poses generated at about the same time are sufficiently synchronous and similar) (Step 335). In the disclosed embodiment, controller 20 may make this determination by comparing a distance between centers of the measured and estimated poses with a sum of the corresponding uncertainty sphere radiuses. When the distance is greater than the sum of the radiuses, the uncertainty spheres may not overlap, and control may move to step 310 where the signals from sensors 18 may be rejected for the current cycle. Otherwise, the signals may be accepted as valid signals and further processed. It should be noted that multiple poses may be estimated between successive pose measurements, and the overlap detection operation may be performed only with the estimated pose generated at about the same time that the measured pose was generated (see FIG. 2, with estimation $E_3$ and measurement $M_1$). It is contemplated that other methods may alternatively be used to determine if the estimated and measured poses are sufficiently synchronous and similar, if desired.

If, at step 335, controller 20 determines that the uncertainty spheres of the estimated and measured poses overlap, controller 20 may then determine the amount of overlap between the poses (Step 340). If the amount of overlap is low (e.g., less than a threshold percent), controller 20 may adjust the measured pose (e.g., the location of the center point and/or a length of the uncertainty sphere radius) so that the uncertainty sphere of the adjusted measured pose encompasses the entire sphere of the originally measured pose (e.g., the new uncertainty sphere of the adjusted measured pose is generally tangent with a side of the original uncertainty sphere opposite the estimated pose) as well as the center point of the estimated pose (See FIGS. 2 and 4) (Step 345). In other words, the measured pose may be adjusted in the direction of the estimated pose to overlap a greater amount of the estimated pose.

Figure 5:
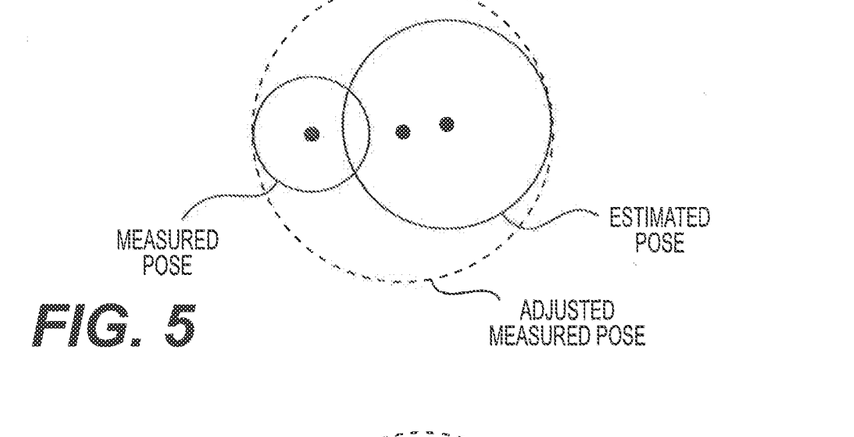

Alternative ways of adjusting the measured pose may be implemented at step 345, if desired. For example, FIG. 5 shows the measured pose being adjusted such that the uncertainty sphere of the adjusted measured pose encompasses all of the uncertainty sphere of the estimated pose, rather than just the center. In this embodiment, the new uncertainty sphere of the measured pose is still generally tangent with the side of the original uncertainty sphere opposite the estimated pose, but the size of the new uncertainty sphere is larger. This may function to push the center of the adjusted measured pose closer to the estimated pose.

Figure 6:
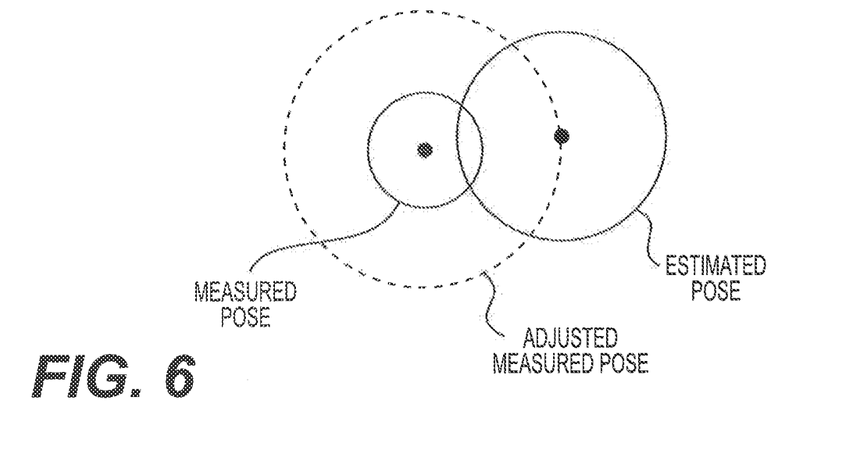

Another way to adjust the measured pose is illustrated in FIG. 6. In this embodiment, the adjusted pose is generally concentric with the original measured pose and passes through the center of the estimated pose. This may function to maintain the same general location of the adjusted measured pose, but increase the uncertainty value associated with the adjustment.

Regardless of the way in which the measured pose is adjusted in response to a low-overlap situation, after completion of step 345 (or alternatively directly after completion of step 340 when sufficient overlap already exists) controller 20 may determine an error between the measured pose (as adjusted) and the estimated pose (Step 350). In the disclosed embodiment, the error may be determined as a subtraction function, although other strategies may alternatively be implemented. Controller 20 may then perform a Kalman Filter update based on the error to determine a corresponding correction to the estimation-based pose solution (Step 355). In other words, instead of the pose solution being solely dependent on the estimated pose (e.g., instead of the pose solution passing directly through the center of the estimated pose) at the time of measured pose generation, controller 20 may determine a correction to the pose solution that moves the pose solution to a compromise or arbitration location between the centers of the estimated pose and the measured pose (as adjusted). This correction may then be used in step 330 to correct or update the pose solution each time a measured pose is generated. Control may then proceed from step 330 to step 300 for initiation of the next cycle.

The disclosed positioning system may improve navigational accuracy and provide enhanced stability. Specifically, when multiple sensors 18 are provided that each measure the pose of machine 12 (e.g., providing measured poses $M_1$ and $M_2$—See FIG. 2), it may be possible for the sensors 18 to disagree with each other (even when all sensors 18 are functioning properly). Unlike conventional navigational systems, where the pose solution is required to always pass through a center of the measured poses, the disclosed system may reduce significant jumps in the pose solution (i.e., reduce undulations in the pose solution line shown in FIG. 2 between the locations of $M_1$ and $M_2$) by adjusting the measured poses based on an overlap with estimated poses generated at about the same time. This may result in a smoothing out of the pose solution line, corresponding with greater stability and improved navigational accuracy.

It will be apparent to those skilled in the art that various modifications and variations can be made to the disclosed positioning system. Other embodiments will be apparent to those skilled in the art from consideration of the specification and practice of the disclosed positioning system. For example, it is contemplated that in applications where only a single sensor 18 generates as measured pose of machine 12, the pose solution may pass through the center of the measured pose without the measured pose being adjusted and/or without use of the Kalman Filter update, if desired. It is intended that the specification and examples be considered as exemplary only, with a true scope being indicated by the following claims and their equivalents.

What is claimed is:

1. A positioning system for use with a mobile machine, comprising: a first sensor configured to generate a first signal indicative of a pose of the mobile machine; a second sensor configured to generate a second signal indicative of a parameter of the mobile machine; and a controller in communication with the first and second sensors, the controller configured to: receive a first pose solution from a memory location; generate a measured pose of the mobile machine based on the first signal; generate an estimated pose of the mobile machine based on the first pose solution and the second signal; determine uncertainty values associated with each of the measured and estimated poses; determine an overlap of the uncertainty values; selectively adjust the measured pose and uncertainty value based on the overlap; and determine a second pose solution based on the estimated pose and adjustment of the measured pose and uncertainty value.

2. The positioning system of claim 1, wherein the controller determines the second pose solution based on the estimated pose and adjustment of the measured pose and uncertainty value only when the estimated and measured poses are generally synchronous.

3. The positioning system of claim 2, wherein the controller is further configured to selectively determine the second pose solution based on only the estimated pose when the estimated and measured poses are not generally synchronous and the uncertainty values do not overlap.

4. The positioning system of claim 3, wherein the second pose solution passes through a center of the estimated pose when the estimated and measured poses are not generally synchronous and the uncertainty values do not overlap.

5. The positioning system of claim 1, wherein the controller is configured to adjust the measured pose and uncertainty value_only when the uncertainty values overlap and the overlap is less than a threshold %.

6. The positioning system of claim 1, wherein the controller is further configured to determine a difference between the measured pose as adjusted and the estimated pose, and to perform a Kalman filter update to determine the second pose solution.

7. The positioning system of claim 1, wherein the controller is configured to adjust the measured pose and uncertainty value by moving the measured pose toward the estimated pose and increasing a size of the uncertainty value associated with the measured pose to encompass an original uncertainty value associated with the measured pose and the estimated pose.

8. The positioning system of claim 1, wherein the controller is configured to adjust the measured pose and uncertainty value by moving the measured pose toward the estimated pose and increasing a size of the uncertainty value associated with the measured pose to encompass an original uncertainty value associated with the measured pose and an original uncertainty value associated with the estimated pose.

9. The positioning system of claim 1, wherein the controller is configured to adjust the measured pose and uncertainty value by only increasing a size of the uncertainty value associated with the measured pose to encompass an original uncertainty value associated with the measured pose and the estimated pose.

10. The positioning system of claim 1, wherein the first sensor is a GNSS receiver.

11. The positioning system of claim 10, wherein the second sensor is an IMU.

12. The positioning system of claim 1, wherein the parameter includes at least one of an acceleration, a velocity, a heading, and an angular rate.

13. The positioning system of claim 1, wherein the controller is further configured to selectively initialize the second pose solution with the measured pose when the mobile machine is stationary.

14. The positioning system of claim 1, wherein the controller is configured to perform a sensor check prior to determining the second pose solution.

15. The positioning system of claim 14, wherein the sensor check includes a cross-check between the first and second sensors.

16. The positioning system of claim 15, wherein the sensor check further includes at least one of a communication check, a diagnostic check, a timing check, an out-of-range check, and an in-range check.

17. A method of determining a position of a mobile machine, comprising: receiving, by a controller, a first pose solution from a memory location; generating, by the controller, a measured pose of the mobile machine based on a first signal from a first sensor; generating, by the controller, an estimated pose of the mobile machine based on the first pose solution and a second signal from a second sensor; determining, by the controller, uncertainty values associated with each of the measured and estimated poses; determining, by the controller, an overlap of the uncertainty values; selectively adjusting, by the controller, the measured pose and uncertainty value based on the overlap; and determining, by the controller, a second pose solution based on the estimated pose and adjustment of the measured pose.

18. The method of claim 17, wherein: determining the second pose solution includes determining the second pose solution based on the estimated pose and adjustment of the measured pose only when the estimated and measured poses are generally synchronous; and the method further includes selectively determining the second pose solution based on only the estimated pose when the estimated and measured poses are not generally synchronous and the uncertainty values do not overlap.

19. The method of claim 17, wherein adjusting the measured pose and uncertainty value includes adjusting the measured pose only when the uncertainty values overlap and the overlap is less than a threshold %.

20. The method of claim 17, further including performing a plurality of sensor checks prior to determining the second pose solution, the plurality of sensor checks including at least two of a cross-check, a communication check, a diagnostic check, a timing check, an out-of-range check, and an in-range check, wherein generating the measured and estimated poses includes generating the measured and estimated poses based on sensor input prior to performing the plurality of sensor checks.

* * * * *

UNITED STATES PATENT AND TRADEMARK OFFICE
CERTIFICATE OF CORRECTION

| | | |
|---|---|---|
| PATENT NO. | : 9,494,430 B2 | |
| APPLICATION NO. | : 14/524727 | |
| DATED | : November 15, 2016 | |
| INVENTOR(S) | : Friend et al. | |

It is certified that error appears in the above-identified patent and that said Letters Patent is hereby corrected as shown below:

In the Claims

Column 8, Lines 31-47, In Claim 1, delete "A positioning system for use with a mobile machine, comprising:
a first sensor configured to generate a first signal indicative of a pose of the mobile machine; a second sensor configured to generate a second signal indicative of a parameter of the mobile machine; and a controller in communication with the first and second sensors, the controller configured to: receive a first pose solution from a memory location; generate a measured pose of the mobile machine based on the first signal; generate an estimated pose of the mobile machine based on the first pose solution and the second signal; determine uncertainty values associated with each of the measured and estimated poses; determine an overlap of the uncertainty values; selectively adjust the measured pose and uncertainty value based on the overlap; and determine a second pose solution based on the estimated pose and adjustment of the measured pose and uncertainty value." and insert -- A positioning system for use with a mobile machine, comprising:
a first sensor configured to generate a first signal indicative of a pose of the mobile machine;
a second sensor configured to generate a second signal indicative of a parameter of the mobile machine; and
a controller in communication with the first and second sensors, the controller configured to:
receive a first pose solution from a memory location;
generate a measured pose of the mobile machine based on the first signal;
generate an estimated pose of the mobile machine based on the first pose solution and the second signal;
determine uncertainty values associated with each of the measured and estimated poses;
determine an overlap of the uncertainty values;
selectively adjust the measured pose and uncertainty value based on the overlap; and
determine a second pose solution based on the estimated pose and adjustment of the measured pose and uncertainty value. --.

Column 8, Line 64, In Claim 5, delete "value_only" and insert -- value only --.

Signed and Sealed this
Eleventh Day of April, 2017

Michelle K. Lee
*Director of the United States Patent and Trademark Office*

Column 10, Lines 5-18, In Claim 17, delete "A method of determining a position of a mobile machine, comprising: receiving, by a controller, a first pose solution from a memory location; generating, by the controller, a measured pose of the mobile machine based on a first signal from a first sensor; generating, by the controller, an estimated pose of the mobile machine based on the first pose solution and a second signal from a second sensor; determining, by the controller, uncertainty values associated with each of the measured and estimated poses; determining, by the controller, an overlap of the uncertainty values; selectively adjusting, by the controller, the measured pose and uncertainty value based on the overlap;
and determining, by the controller, a second pose solution based on the estimated pose and adjustment of the measured pose." and insert -- A method of determining a position of a mobile machine, comprising:
receiving, by a controller, a first pose solution from a memory location;
generating, by the controller, a measured pose of the mobile machine based on a first signal from a first sensor;
generating, by the controller, an estimated pose of the mobile machine based on the first pose solution and a second signal from a second sensor;
determining, by the controller, uncertainty values associated with each of the measured and estimated poses; determining, by the controller, an overlap of the uncertainty values; selectively adjusting, by the controller, the measured pose and uncertainty value based on the overlap; and
determining, by the controller, a second pose solution based on the estimated pose and adjustment of the measured pose. --.

Column 10, Lines 19-27, In Claim 18, delete "The method of claim 17, wherein: determining the second pose solution includes determining the second pose solution based on the estimated pose and adjustment of the measured pose only when the estimated and measured poses are generally synchronous; and the method further includes selectively determining the second pose solution based on only the estimated pose when the estimated and measured poses are not generally synchronous and the uncertainty values do not overlap." and insert -- The method of claim 17, wherein:
determining the second pose solution includes determining the second pose solution based on the estimated pose and adjustment of the measured pose only when the estimated and measured poses are generally synchronous; and
the method further includes selectively determining the second pose solution based on only the estimated pose when the estimated and measured poses are not generally synchronous and the uncertainty values do not overlap. --.